United States Patent
Elliott

(10) Patent No.: US 11,490,728 B2
(45) Date of Patent: Nov. 8, 2022

(54) EASY SLIDE POLE CADDY BRACKET

(71) Applicant: Kenney Manufacturing Company, Warwick, RI (US)

(72) Inventor: Timothy Elliott, Attleboro, MA (US)

(73) Assignee: Kenney Manufacturing Company, Warwick, RI (US)

(*) Notice: Subject to any disclaimer, the term of this patent is extended or adjusted under 35 U.S.C. 154(b) by 0 days.

(21) Appl. No.: 17/154,688

(22) Filed: Jan. 21, 2021

(65) Prior Publication Data

US 2021/0368978 A1 Dec. 2, 2021

Related U.S. Application Data

(60) Provisional application No. 63/030,026, filed on May 26, 2020.

(51) Int. Cl.
| | |
|---|---|
| *F16M 11/00* | (2006.01) |
| *A47B 57/56* | (2006.01) |
| *F16B 2/06* | (2006.01) |
| *A47B 57/26* | (2006.01) |
| *F16M 11/04* | (2006.01) |
| *A47K 3/28* | (2006.01) |

(52) U.S. Cl.
CPC .......... *A47B 57/562* (2013.01); *A47B 57/265* (2013.01); *A47K 3/281* (2013.01); *F16B 2/065* (2013.01); *F16M 11/046* (2013.01)

(58) Field of Classification Search
CPC ....... F16M 11/046; F16B 2/065; A47K 3/281; A47B 57/265; A47B 57/562
See application file for complete search history.

(56) References Cited

U.S. PATENT DOCUMENTS

| | | | |
|---|---|---|---|
| 4,390,201 A | 6/1983 | Saunders | |
| 4,697,775 A | 10/1987 | Wille | |
| 4,844,397 A * | 7/1989 | Skakoon | ............... F16B 41/005 |
| | | | 248/231.71 |
| 5,758,851 A | 6/1998 | Remmers | |
| 7,059,025 B2 | 6/2006 | Edland | |
| 7,540,456 B2 | 6/2009 | Thompson | |
| 7,556,229 B2 | 7/2009 | Elliott et al. | |
| 7,866,928 B2 | 1/2011 | Schmitz | |
| 8,167,259 B2 * | 5/2012 | Spang, Jr. | ........... A61M 39/283 |
| | | | 248/230.4 |
| 8,225,946 B2 | 7/2012 | Yang et al. | |
| 8,408,405 B2 | 4/2013 | Yang et al. | |
| 9,339,151 B2 | 5/2016 | Yang et al. | |
| 9,341,308 B2 * | 5/2016 | Lacy | .................... F16M 13/022 |
| 9,770,138 B2 | 9/2017 | Engell | |
| 9,883,742 B2 | 2/2018 | Yang et al. | |
| 9,943,192 B2 | 4/2018 | Yang et al. | |
| 10,280,957 B2 | 5/2019 | Mutch et al. | |
| 2002/0172549 A1 | 11/2002 | Koros et al. | |

(Continued)

FOREIGN PATENT DOCUMENTS

| | | |
|---|---|---|
| CN | 108185786 A | 6/2018 |
| CN | 108778056 A | 11/2018 |

*Primary Examiner* — Amy J. Sterling
(74) *Attorney, Agent, or Firm* — Adler Pollock & Sheehan P.C

(57) ABSTRACT

A disengageable connection includes a back portion, a front portion, a handle portion, and a clutch plate portion, the back portion and the front portion are configured to removably secure a tube using the clutch plate portion and the handle portion.

11 Claims, 4 Drawing Sheets

(56) References Cited

U.S. PATENT DOCUMENTS

| | | |
|---|---|---|
| 2011/0226922 A1 | 9/2011 | Ishizaki et al. |
| 2014/0084118 A1 | 3/2014 | Tooley et al. |
| 2014/0353982 A1 | 12/2014 | Wei |

* cited by examiner

EASY SLIDE POLE CADDY BRACKET

CROSS REFERENCE TO RELATED APPLICATIONS

This application claims benefit from U.S. Provisional Patent Application Ser. No. 63/030,026, filed May 26, 2020, which is incorporated by reference in its entirety.

BACKGROUND OF THE INVENTION

The present invention generally relates to brackets, and more specifically to an easy slide pole caddy bracket.

In general, a typical pole caddy includes one or more shelves which are cantilevered from a single vertical pole. Disengageable connections, referred to as pole caddy brackets, are used on pole caddys to link the shelves to the vertical pole. These disengageable connections usually require a use of a tool to engage and disengage, such as a screwdriver.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an aspect, the invention features a pole caddy bracket including a back portion, a front portion, a handle portion, and a clutch plate portion.

In another aspect, the invention features pole caddy including a rear portion having two protrusions and shaped to receive a first portion of a circular tube, a front portion having a circular protrusion and two apertures and shaped to receive a second portion of the circular tube, the two apertures configured to receive the two protrusions of the rear portion, a bracket clutch portion configured to rotate about the circular protrusion of the front portion, and a bracket handle portion configured to rotate about and removably secure the circular protrusion of the front portion.

In still another aspect, the invention features a disengageable connection including a back portion, a front portion, a handle portion, and a clutch plate portion, the back portion and the front portion are configured to removably secure a tube using the clutch plate portion and the handle portion.

Embodiments of the invention may have one or more of the following advantages.

The present invention is a disengageable connection that does not require a use of any tool to engage and disengage it around a pole.

The disengageable connection of the present invention enables user to quickly and easily engage and disengage shelving around a vertical pole without the use of a tool, such as a screwdriver.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein.

DETAILED DESCRIPTION

Figure 1:
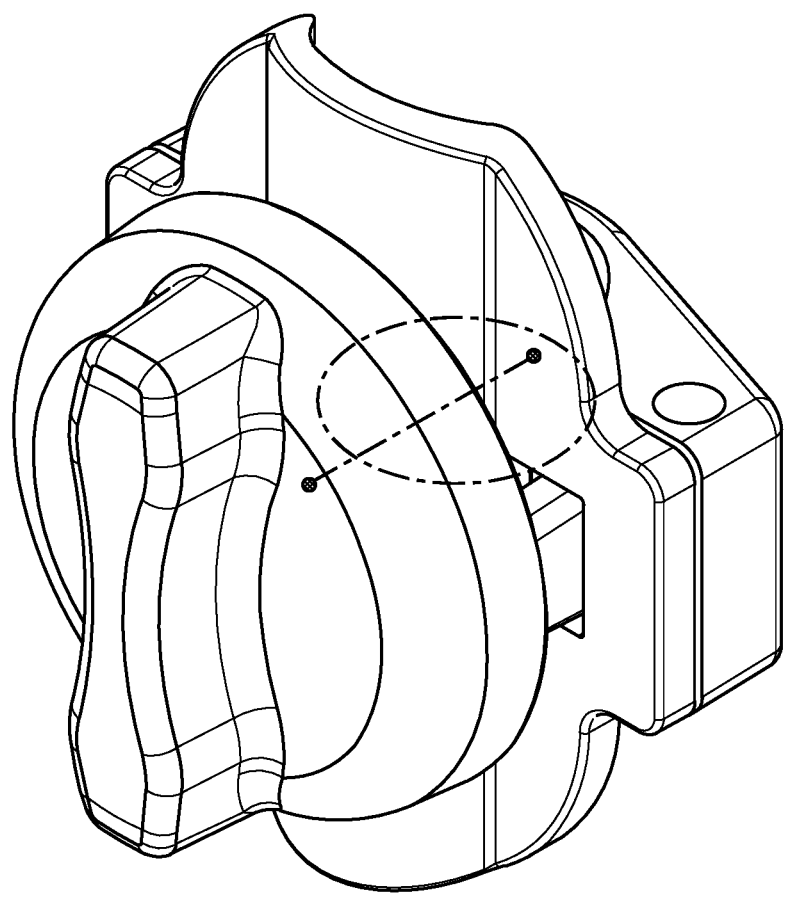
FIG. 1 illustrates an exemplary easy slide pole caddy bracket.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

In FIG. 1, an exemplary easy slide pole caddy bracket 10 is shown. The easy slide pole caddy bracket 10 is a disengageable connection that may be used on pole caddys, for example, to link shelves to a vertical pole without the use of tools, such as a screwdriver, to engage and disengage.

Figure 2:
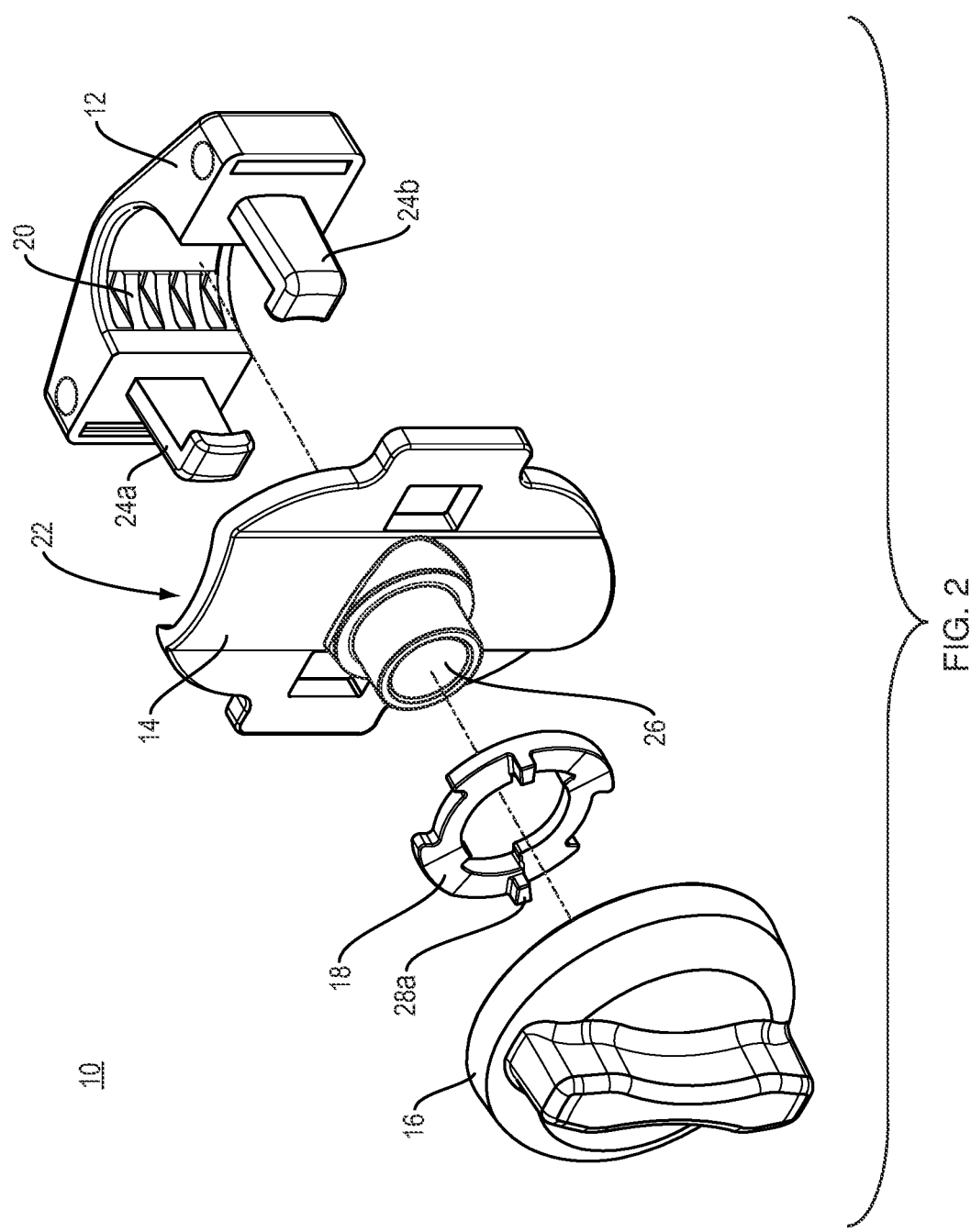
FIG. 2 illustrates a front prospective view of a closed easy slide pole caddy bracket.

As shown in FIG. 2, a front prospective of the easy slide pole caddy bracket 10 includes a back portion 12, a front portion 14, a handle portion 16 and a clutch plate portion 18. The easy slide pole caddy bracket 10 is designed to capture a pole caddy tube (not shown) between the back portion 12 and the front portion 14 using the clutch plate portion 18 and the handle portion 16. The back portion 12 includes a curved back portion recess 20 and the front portion 14 includes a curved front portion recess 22. The recesses 20, 20 enable a pole (not shown) to be captured when the front portion 14 is pressed against the back portion 12.

More specifically, the clutch plate portion 18 fits over prongs 14a, 24b of the back portion 10 and rotates to accept a protrusion boss (shown in FIG. 3) on a back of the handle portion 16 that snaps into a center 26 of the front portion 14. The strategically placed bosses 28a, 28b on the clutch plate portion 18 when installed prevent it from coming off of the back portion's 10 prongs 24a, 24b. A transition of a thicknesses in the clutch plate portion 40 drive a position of the prongs on the back portion 10 and move the back portion 10 and the front portion 20 together and apart. The movement of the clutch plate portion 18 is controlled by a rotation (e.g., quarter turn) of the handle portion 16 to loosen and tighten the back portion 12 and the front portion 14 about the pole. Here, the easy slide pole caddy bracket 10 is considered "closed" when the back portion 12 and front portion 14 are pressed against and secure a pole, and considered "open" when a pole can easily slide between the back portion 12 and front portion 14.

Figure 3:
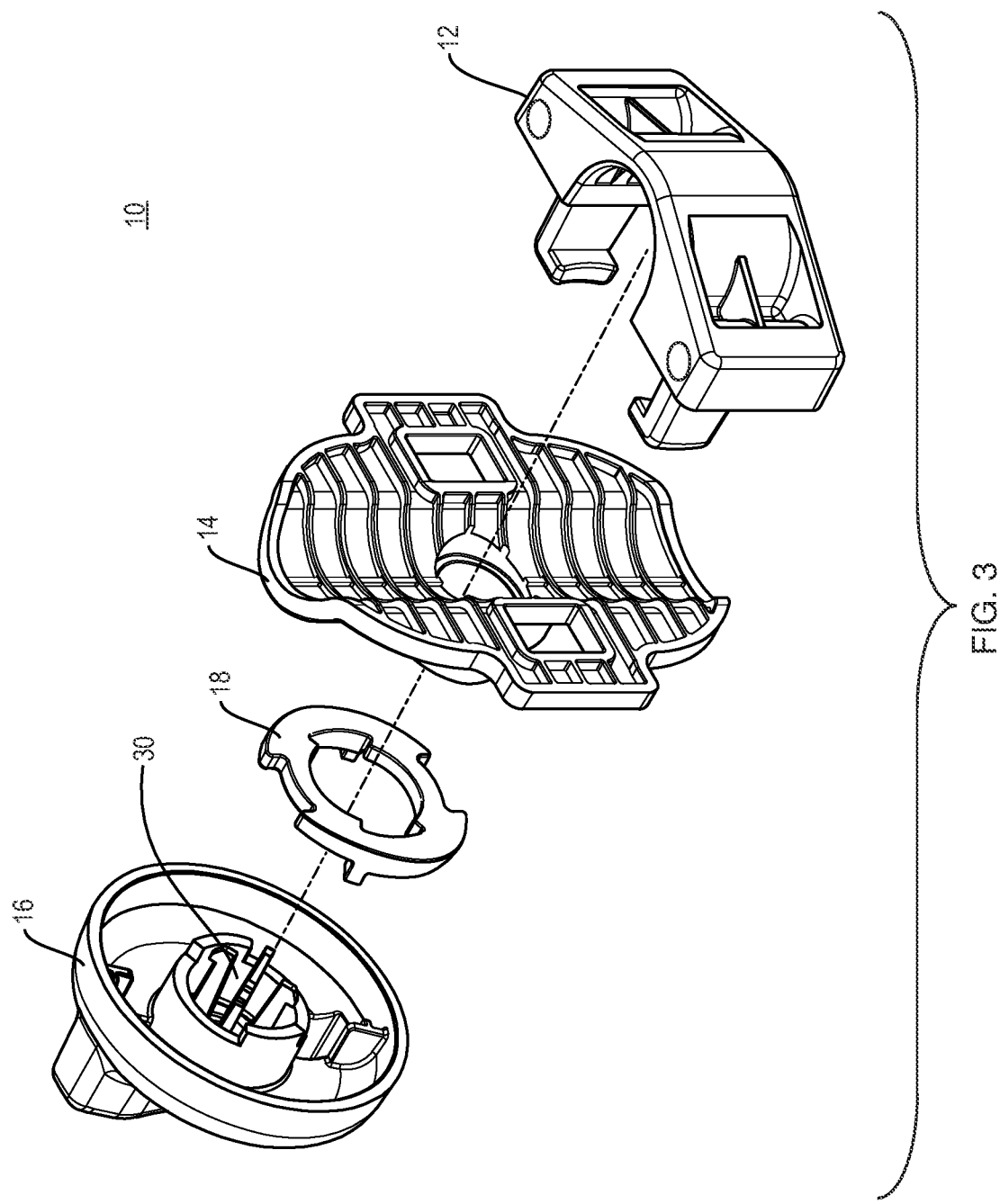
FIG. 3 illustrates a rear prospective view of an open easy slide pole caddy bracket.

As shown in FIG. 3, a rear prospective of the easy slide pole caddy bracket 10 includes the back portion 12, the front portion 14, the handle portion 16 and the clutch plate portion 18. Here, a protrusion boss 30 on a back of the handle portion 16 that snaps into the center 26 of the front portion 14 is illustrated.

Figure 4:
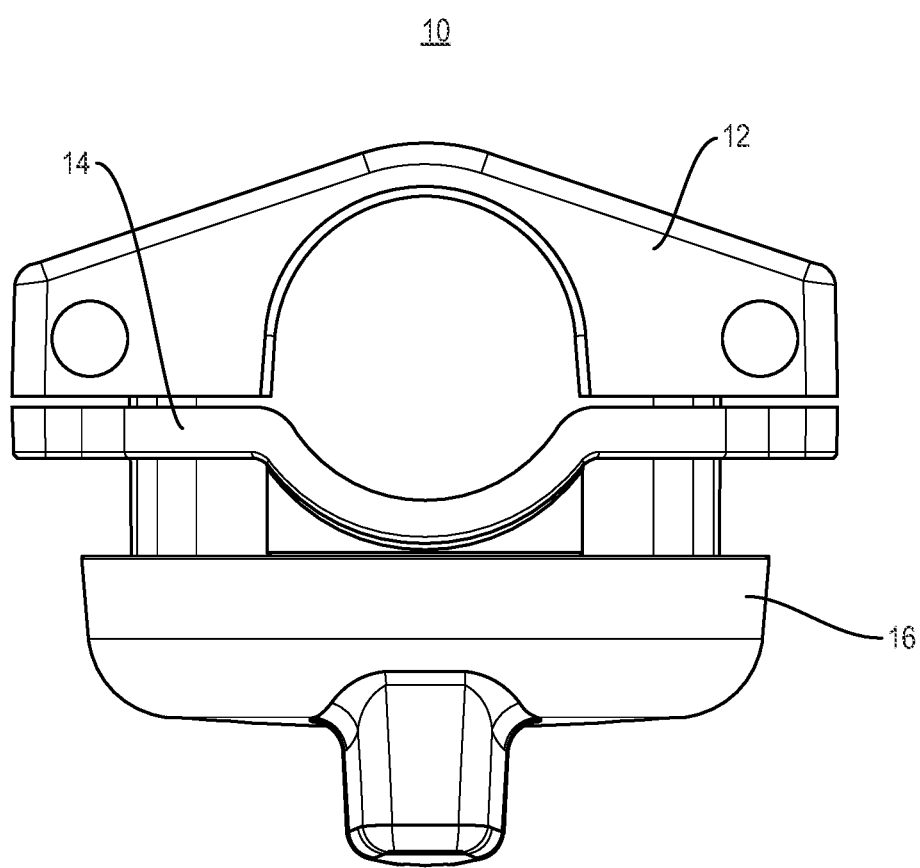
FIG. 4 illustrates a top view of a closed easy slide pole caddy bracket.

In FIG. 4, a top view of the easy slide pole caddy bracket 10 is illustrated in a "closed" position as it would appear if a pole was captured between the back portion 12 and the front portion 14.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A pole caddy bracket comprising:
   a back portion;
   a front portion;
   a handle portion; and
   a clutch plate portion,
   wherein the back portion and the front portion are configured to removably secure a pole caddy tube using the clutch plate portion and the handle portion,
   wherein the clutch plate portion fits over back portion prongs and rotates to accept a protrusion boss on a back of the handle portion that snaps into a center of the front portion.

2. The pole caddy of claim 1 wherein bosses on the clutch plate portion 40 prevent the clutch plate portion from coming off of the back portion's prongs.

3. The pole caddy of claim 2 where a transition of a thicknesses in the clutch plate portion drives a position of the back portion prongs and move the back portion and the front portion together and apart relative to each other.

4. The pole caddy of claim 3 wherein a movement of the clutch plate portion is controlled by a rotation to loosen and tighten the back portion and the front portion to the pole caddy tube.

5. A pole caddy comprising:
   a rear portion having two protrusions and shaped to receive a first portion of a circular tube;
   a front portion having a circular protrusion and two apertures and shaped to receive a second portion of the circular tube, the two apertures configured to receive the two protrusions of the rear portion;
   a bracket clutch portion configured to rotate about the circular protrusion of the front portion; and
   a bracket handle portion configured to rotate about and removably secure the circular protrusion of the front portion.

6. The pole caddy bracket of claim 5 wherein the clutch plate portion fits over back portion prongs and rotates to accept a protrusion boss on a back of the handle portion that snaps into a center of the front portion.

7. The pole caddy of claim 6 wherein bosses on the clutch plate portion prevent the clutch plate portion from coming off of the back portion's prongs.

8. A disengageable connection comprising:
   a back portion;
   a front portion;
   a handle portion; and
   a clutch plate portion, the back portion and the front portion are configured to removably secure a tube using the clutch plate portion and the handle portion,
   wherein rein the clutch plate portion fits over back portion prongs and rotates to accept a protrusion boss on a back of the handle portion that snaps into a center of the front portion.

9. The disengageable connection of claim 8 wherein bosses on the clutch plate portion 40 prevent the clutch plate portion from coming off of the back portion's prongs.

10. The disengageable connection of claim 9 where a transition of a thicknesses in the clutch plate portion drives a position of the back portion prongs and move the back portion and the front portion together and apart relative to each other.

11. The disengageable connection of claim 10 wherein a movement of the clutch plate portion is controlled by a rotation to loosen and tighten the back portion and the front portion to the pole caddy tube.

* * * * *